United States Patent

[11] 3,609,759

[72] Inventor Daniel E. Teske
Spanish Lake, Mo.
[21] Appl. No. 889,474
[22] Filed Dec. 31, 1969
[45] Patented Sept. 28, 1971
[73] Assignee Emerson Electric Co.
St. Louis, Mo.

[54] PHOTOELECTRIC KEYBOARD ENCODER

10 Claims, 13 Drawing Figs.

[52] U.S. Cl. .......... 340/365, 178/17, 197/98
[51] Int. Cl. .......... G08c 9/06
[50] Field of Search .......... 340/365, 345, 380; 178/17 C, 17 D; 197/98; 250/219

[56] References Cited

UNITED STATES PATENTS

| | | | |
|---|---|---|---|
| 2,641,753 | 6/1953 | Oliwa | 340/365 X |
| 3,017,463 | 1/1962 | Dinsmone et al. | 197/98 X |
| 3,169,506 | 2/1965 | Morris | 197/98 X |
| 3,253,087 | 5/1966 | McIntosh | 340/365 X |
| 3,519,116 | 7/1970 | Koehn | 340/380 X |

*Primary Examiner*—Richard Murray
*Attorneys*—Stanley N. Garber and William R. O'Meara

ABSTRACT: A photoelectric encoder for converting information, such as numbers of the decimal system into a series of digital signals of a binary code. The encoder includes a keyboard with keys in the form of vertical columns of light transparent material, each having therein a predetermined number of reflective surfaces. The keys are arranged in parallel rows with a light source to one side of the keyboard and photocells, at predetermined vertical levels, adjacent another side of the keyboard. The reflective surfaces throughout the keyboard are predeterminately located such that no light is transmitted through the keys to the photocells when the keys are in their raised positions. When a key is depressed, one or more light reflecting surfaces are moved in such positions that light is reflected to one or more of the photocells to thereby produce one or more binary code pulses.

Daniel E. Teske,
Inventor
Stanley N. Garber,
Attorney

PHOTOELECTRIC KEYBOARD ENCODER

BACKGROUND OF THE INVENTION

This invention relates to encoders and more particularly to a photoelectric keyboard encoder.

In many prior art encoders, where it is desired to convert information, such as numbers of the decimal system into binary code signals for insertion in a computer, relatively complicated and expensive decimal-to-binary means are necessary. For example, well known decimal-to-binary circuit means generally include a keyboard of the electromechanical type and a relatively large number of circuit components, such as diodes, for each bit. Such prior art circuits are obviously relatively complicated and expensive and also have the disadvantages connected with mechanical contacts, such as arcing and wear.

SUMMARY OF THE INVENTION

Accordingly, it is a general object of the present invention to provide a novel photoelectric encoder which obviates the above-mentioned disadvantages.

A more specific object is to provide a photoelectric encoder which avoids the necessity of mechanical switches and eliminates substantial amounts of circuit components.

In accordance with one aspect of the present invention, a photoelectric keyboard encoder is provided which includes a group of columns arranged in adjacent rows, each column including a light transparent zone and light reflection means. Means are provided for applying light to one side of the group of columns and a plurality of light responsive means are disposed adjacent another side of the group at predetermined levels along the columns, the columns being movable so that when a column is moved, light is reflected by the light reflection means of the column to one or more of the light responsive means to provide an output signal. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figures 1, 2:
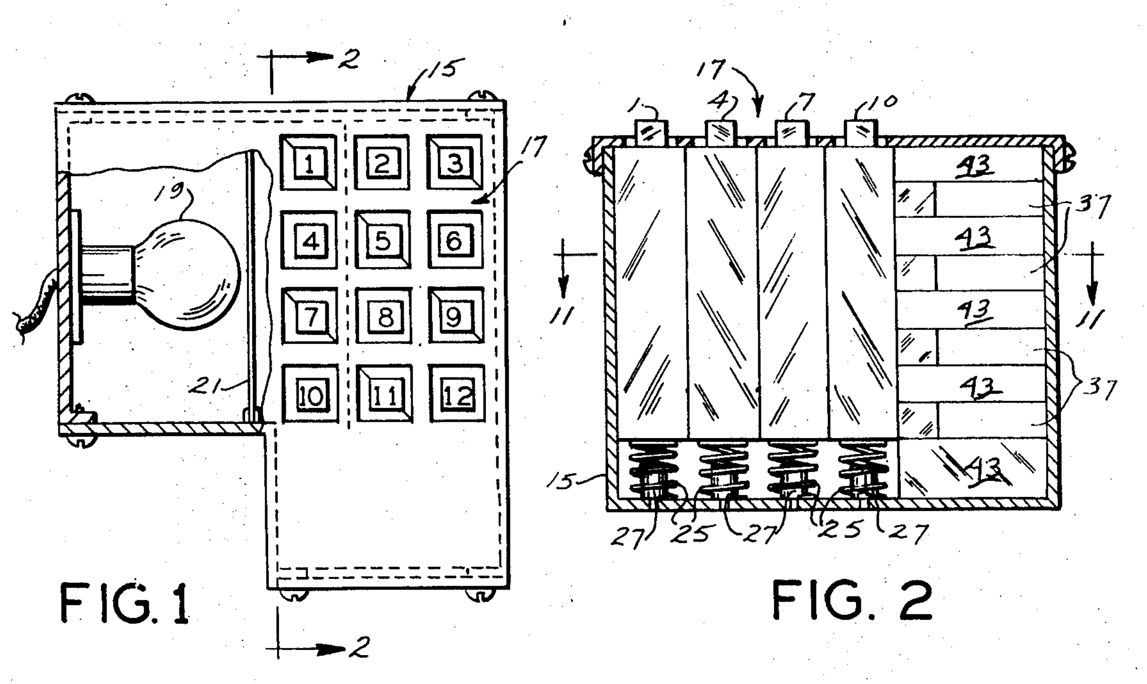
FIG. 1 is a plan view, partly broken away, of a preferred embodiment of the present invention.
FIG. 2 is a sectional view taken along line 2—2 of FIG. 1.
Figure 3:
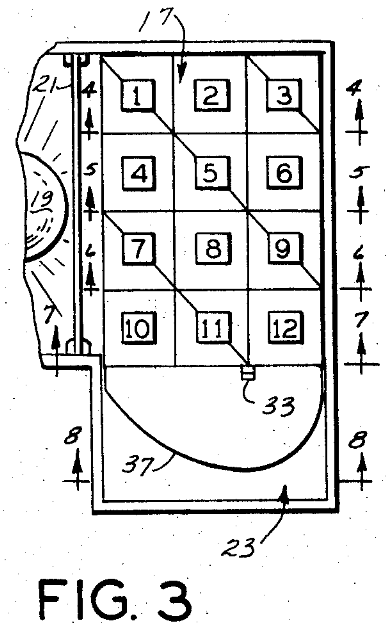
FIG. 3 is a top plan view of certain parts of the encoder of FIG. 1.

Referring now to the drawings, and particularly to FIGS. 1–3, the present encoder is shown to comprise a housing or cabinet 15 having therein a keyboard 17 consisting of a plurality of individually operable keys numbered, for example, 1–12. A light source 19 is contained within the housing 15 to one side of the keyboard 17 and is separated therefrom by a light diffusing transparent partition 21. Also contained within the housing 15 adjacent another side of the keyboard 17 is an array of vertically spaced light responsive means 23. In general, the arrangement is such that with the keys 1–12 in their idle or retracted positions, light flux from the source 19 passes through the keyboard from left to right, as viewed in FIG. 1. However, when one of the keys 1–12 is depressed, the light flux from source 19 is reflected 90° to one or more of the light-responsive means 23 which produces a binary waveform output unique to the particular key depressed.

More specifically, keyboard 17 is comprised of four parallel rows of three keys each, each key comprising a vertical column or plunger of light transparent material, such as glass or plastic, with a numbered button at its top. As illustrated in FIG. 2, each of the keys is vertically movable between retracted and depressed positions on springs 25 retained on pins 27 extending from the floor of the housing 15. Thus, when a key is depressed, it moves downwardly in the housing against the urging of spring 25 until it strikes pin 27, and when released, it again moves upwardly to its retracted position under the urging of spring 25.

Each of the keys 1–12 is uniquely configured to provide a unique binary code waveform output. As illustrated in FIGS. 4–7 and 9, the key plungers 1–12 are elongate rectangular columns having at least one light-reflecting surface 29 formed therein, the surfaces 29 each comprising a 45° triangular section extending diagonally across the column, and at least one light transmitting rectangular section 31. They keys 1–12 are distinctly coded by arranging the light-reflecting surfaces 29 on each key in a predetermined axial pattern. As shown in FIGS. 4–7, the keys are divided into plural axial zones *a*, *b*, *c*, *d*, *e*, *f*, *g* and *h* with each zone or level containing either a light reflecting 45° surface 29 or a plain rectangular surface 31. Thus, key 1 has a single light-reflecting surface 29 at the *a* level and nonreflecting rectangular surfaces 31 at levels *b* through *h*. Similarly, key 2 has a single light-reflecting surface at level *c*, key 3 a pair of light-reflecting surfaces at levels *a* and *c*, key 4 a single light-reflecting surface at level *e*, key 5 a pair of light-reflecting surfaces at levels *a* and *e*, key 6 a pair of light-reflecting surfaces at levels *c* and *e*, key 7 three light-reflecting surfaces at levels *a*, *c* and *e* and *e*, key 8 a single light-reflecting surface at level *g*, key 9 a pair of light-reflecting surfaces at levels *a* and *g*, key 10 a pair of light-reflecting surfaces at levels *c* and *g*, key 11 three light-reflecting surfaces at levels *a*, *c*, and *g* and key 12 a pair of light-reflecting surfaces at levels *e* and *g*. The remaining levels in each of keys 1–12 consist of nonreflecting rectangular sections 31.

The light source 19 may either comprise a single light bulb, as illustrated in FIG. 1, or plural smaller bulbs adjacent each of the four rows of keyboard columns. In addition, the diffuser 21 may be replaced by a suitable reflector positioned to the left of the bulb 19 for reflecting light to each of the four columns of keys.

Figure 10:
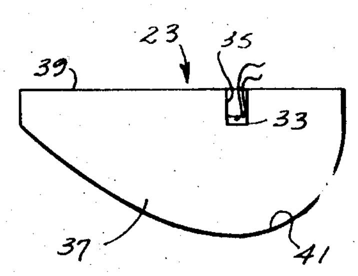
FIG. 10 is an enlarged top view of one of the light responsive elements of the encoder of FIG. 1.
Figure 4:
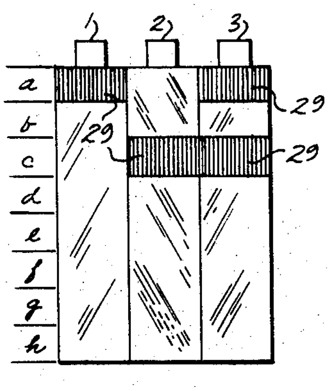
FIGS. 4 through 8 are sectional views taken along lines 4—4 through 8—8, respectively, of FIG. 3.
Figure 5:
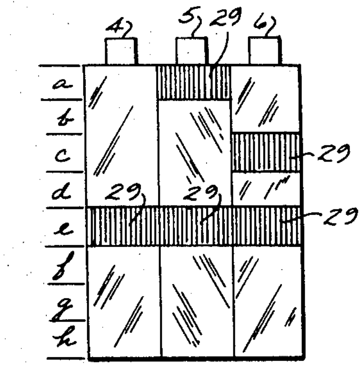
Figure 6:
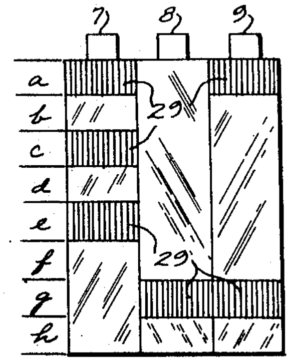
Figure 7:
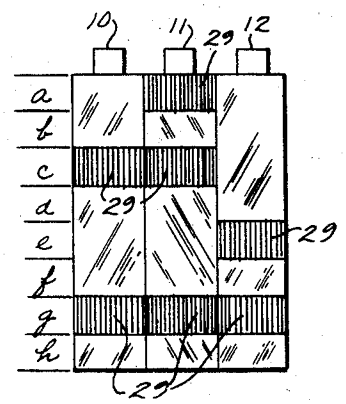
Figure 8:
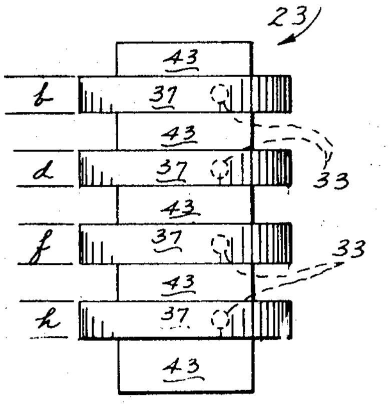
Figure 9:
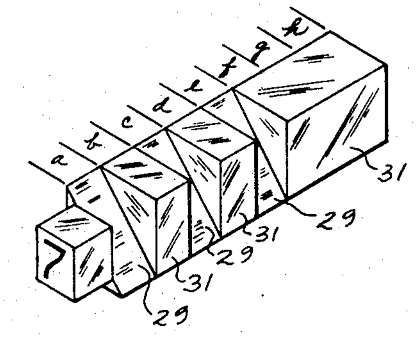
FIG. 9 is a perspective view of one of the keys of the encoder of FIG. 1.

As shown in FIGS. 8 and 10, the light-responsive means 23 comprises photocells 33 carried in recesses 35 formed in generally paraboloid configured flat disks 37. Each disk 37 is geometrically configured such that light flux entering normal to its upper surface 39 will be reflected from its lower surface 41 to the photocell 33. This may be accomplished, for example, by forming the surface 41 along a locus of points equidistant from the photocell focal point of the parabola 37 and a construction line drawn parallel to line 39 below the low point of the parabola a distance equal to the distance between the low point and the photocell. When so constructed, light flux entering anywhere along and normal to side 39 will be reflected to the photocell 33. Alternatively, in lieu of the disk 37 and single photocell 33, individual photocells could be provided adjacent keys 10, 11 and 12 for each of the three groups of keys. The disk 37 may be formed of any suitable transparent material, such as glass or plastic, and may have the surface 41 mirrored, if desired. As shown in FIGS. 2 and 8, four light-responsive disks 37 and photocells 33 are provided at the *b*, *d*, *f* and *h* levels adjacent keys 10, 11 and 12 of the encoder. The disks 37 are supported and separated by spacers 43 located at the *a*, *c*, *e* and *g* levels.

Operation is as follows:

The present photoelectric encoder takes advantage of the light-channeling effect of transparent materials such as glass and plastic. This channeling effect is such that light flux is propagated through a homogeneous transparent material in the direction at which it enters the material until it meets either a surface that is not normal to the flux or until it leaves the material through a surface that is normal. If the light impinges upon a non-normal surface, it is reflected the same as a mirror. The present encoder provides four light channels for converting information, such as numbers 1 through 12 of the decimal system into a series of digital signals of a binary code.

Figure 11:
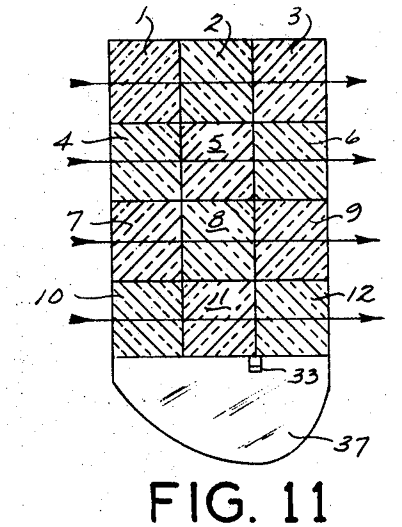
FIGS. 11 and 11A are sectional views taken along the line 11—11 of FIG. 2.
Figure 11A:
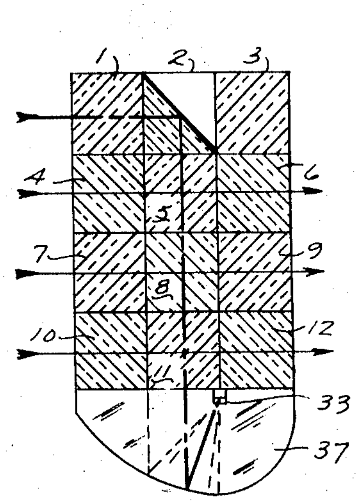

In the idle mode wherein all keys are extended, the key plungers, at the photocell levels *b, d, f* and *h*, present a square cross section with the surfaces of the plungers normal to the light flux. Thus, as shown in FIGS. 1 and 3, the light flux from source 19 travels from left to right through levels *b, d, f* and *h* and impinges on the right wall of enclosure 15 where it is absorbed. Similarly, light flux traveling through the *a, c, e* and *g* levels impinges upon at least one 45° triangular section and is reflected 90° towards the photocell array 23 where it is absorbed by spacers 43 at those levels. However, when a key plunger is depressed, one or more 45° triangular sections are introduced into the light path at the photocell levels *b, d, f* and *h*. The triangular section or sections reflect the light at 90° from its entrance where it is propagated until reaching surface 41 on one or more of the parabolic disks 37. Because of the geometrical construction of the surface 41, the light flux is focused onto the photocell 33 for providing the desired binary waveform output. FIGS. 11 and 11A illustrate the above at the *c* level of the number 2 key.

Figure 12:
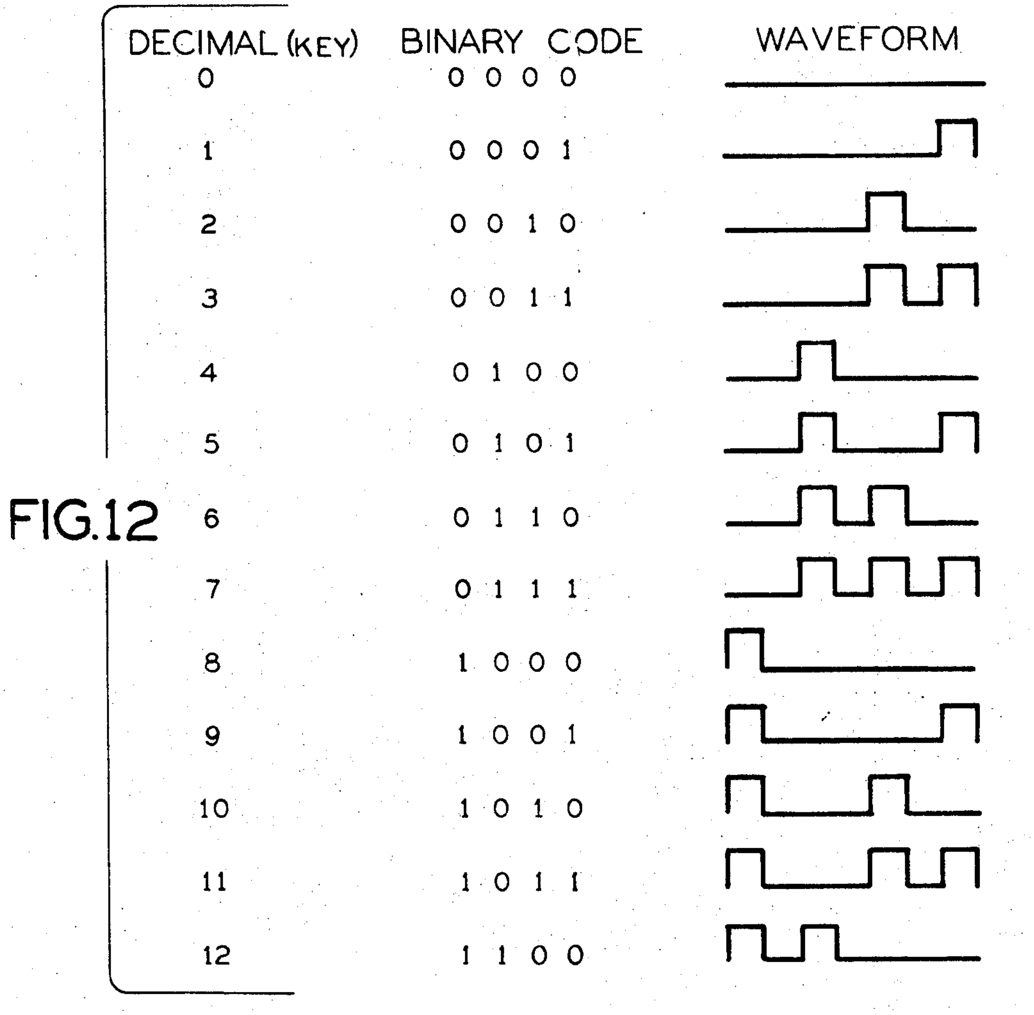
FIG. 12 is a graphical illustration of a typical binary code equivalent of the decimal system together with a signal waveform.

As indicated above, each of the plungers 1–12 is provided with a unique arrangement of light reflecting 45° triangular sections so as to provide a unique output waveform. The waveforms produced by keys 1–12 are illustrated in the right column of FIG. 12. For example, key 7 produces the three-pulse output illustrated in FIG. 12 by reflection of the light off the three 45° triangular sections on the number 7 plunger and illumination of the photocells 33 at the *b, d* and *f* levels.

In view of the above, it will be seen that the several objects of the invention are achieved and other advantageous results obtained.

As various changes could be made in the above constructions without departing from the scope of the invention, it is intended that all matter contained in the above description, or shown in the accompanying drawings, shall be interpreted as illustrative and not in a limiting sense.

What is claimed is:

1. A photoelectric encoder comprising a plurality of parallel plungers having at least one light-transmitting zone and one light-reflecting zone, said zones being axially displaced along the plunger, said plungers being independently movable between retracted and depressed positions, a light source adjacent one side of said plungers and light-responsive means adjacent another side of said plungers at predetermined axial levels, said reflecting zones being predeterminately located at said axial levels so as to reflect said light to said light-responsive means when said plunger is depressed and said reflecting surface is in a common axial level with said light-responsive means, the latter producing an output signal unique to the plunger depressed.

2. The encoder set forth in claim 1 wherein said plungers each comprise a generally rectangular elongate column of light-transmitting material, said columns being arranged in adjacent parallel rows.

3. The encoder set forth in claim 2 wherein said light-reflecting zones each comprise a surface formed in said column at a non-normal angle to the light flux propagated form said light source.

4. The encoder set forth in claim 3 wherein said surfaces are formed at 45° angles to said light flux.

5. The encoder set forth in claim 4 wherein each of the plungers is provided with a unique axial arrangement of light-reflecting 45° surfaces and light-transmitting zones to provide unique output signals.

6. The encoder set forth in claim 1 wherein said light-responsive means comprise plural light-responsive devices disposed at alternate axial levels adjacent said other side of said plungers.

7. The encoder set forth in claim 6 wherein each light responsive device is carried at the focal point of a generally parabolic reflector.

8. The encoder set forth in claim 7 wherein said light-responsive devices comprise photocells.

9. The encoder set forth in claim 5 wherein said light-responsive means comprise plural light-responsive devices, each carried at the focal point of a generally parabolic reflector.

10. The encoder set forth in claim 9 wherein said reflectors comprise transparent disks disposed at alternate axial levels adjacent said other side of said plungers.

UNITED STATES PATENT OFFICE
CERTIFICATE OF CORRECTION

Patent No. 3,609,759 Dated September 28, 1971

Inventor(s) Daniel E. Teske

It is certified that error appears in the above-identified patent and that said Letters Patent are hereby corrected as shown below:

Column 1, line 11, after "decimal-to-binary" insert ---circuit---.

Column 2, line 23, change "They" to ---The---; line 36, cancel the repetitive ---and e---.

Claim 1, line 2, after "plungers" insert ---each---; claim 3, line 21, change "form" to ---from---.

Signed and sealed this 4th day of April 1972.

(SEAL)
Attest:

EDWARD M.FLETCHER,JR.
Attesting Officer

ROBERT GOTTSCHALK
Commissioner of Patents